United States Patent [19]

Esch et al.

[11] Patent Number: 5,283,639
[45] Date of Patent: * Feb. 1, 1994

[54] MULTIPLE MEDIA DELIVERY NETWORK METHOD AND APPARATUS

[76] Inventors: Arthur G. Esch, 26 Paw Paw Hollow La., Leonardtown, Md. 20650; Edward A. Singer, 13 E. Spring St., Alexandria, Va. 22301

[*] Notice: The portion of the term of this patent subsequent to Mar. 24, 2009 has been disclaimed.

[21] Appl. No.: 756,848

[22] Filed: Sep. 10, 1991

Related U.S. Application Data

[63] Continuation-in-part of Ser. No. 431,359, Oct. 23, 1989, Pat. No. 5,099,319.

[51] Int. Cl.⁵ .................. H04N 7/10; H04N 5/222
[52] U.S. Cl. ............................ 348/6; 455/311; 455/53.1; 348/722; 348/906
[58] Field of Search ............ 358/86, 185; 455/3.1, 455/3.2, 4.1, 53.1, 39

[56] References Cited

U.S. PATENT DOCUMENTS

| | | | |
|---|---|---|---|
| 4,340,903 | 7/1982 | Tamura | 358/185 |
| 4,602,279 | 7/1986 | Freeman | 358/86 |
| 4,724,491 | 2/1988 | Lambert | 358/86 |
| 4,805,014 | 2/1989 | Sahara et al. | 358/86 |
| 4,814,883 | 3/1989 | Perine et al. | 358/181 |
| 4,821,032 | 4/1989 | Shimada et al. | 358/185 |
| 4,858,011 | 8/1989 | Jackson et al. | 358/185 |
| 4,860,379 | 8/1989 | Schoeneberger et al. | 358/86 |
| 4,888,638 | 12/1989 | Bohn | 358/85 |
| 4,894,789 | 1/1990 | Yee | 358/86 |
| 4,941,040 | 7/1990 | Pocock et al. | 358/86 |
| 5,027,400 | 6/1991 | Baji et al. | 380/20 |
| 5,099,319 | 3/1992 | Esch et al. | 358/86 |
| 5,182,640 | 1/1993 | Takano | 358/86 |

OTHER PUBLICATIONS

"Affiliate Identification System" by Joseph A. Maltz and Ivan J. Maltz SMPTE Technical Conference Proceedings (Nov. 1987).
"BBC Eurocast on Olympus The New Wave In Pan–European Information Services", by Dr. Stephen Castell, 16th International TV Symposium Record (Jun. 1989).
"Getting More Out of Users Bits", by Stephen Scott, SMPTE Technical Conference Proceedings (Oct. 1989).
"Vertical Interval Communication and Control System", Skotel Corporation (1990).

Primary Examiner—John K. Peng
Attorney, Agent, or Firm—David Newman & Associates

[57] ABSTRACT

A multiple media system having a central site and a remote site for customizing video and audio presentations comprising a communications channel, a studio processor, a scheduling processor, a network processor, a transmitter, a communications processor, a video processor, and optionally a matrix switch, a cue processor, a matrix-switch processor and a system monitor. The studio processor generates one or more content data signals. The content data signals maybe analog or digital, and include text signals, phototext signals and/or audio signals. The scheduling processor generates a schedule data signal, which includes a unique identifier, accounting, administrative and scheduling data. The network processor generates a communication signal which includes the one or more content data signals and the schedule data signals formatted with the video signal. The transmitter transmits the communications signal over the communications channel. At the remote site the communications processor receives the communications signal and selects a first content data signal from the one or more content data signals. The video processor mixes the first content data signal with the video signal. The cue processor is coupled to network feed channel through a matrix switch. In response to detecting network-cue signals, the cue processor generates insertion signals. In response to the insertion-cue signals, the matrix processor controls the matrix switch routes the multiple media signal, which includes the video signal with the additional information from the content data signal, to a network communications channel.

60 Claims, 6 Drawing Sheets

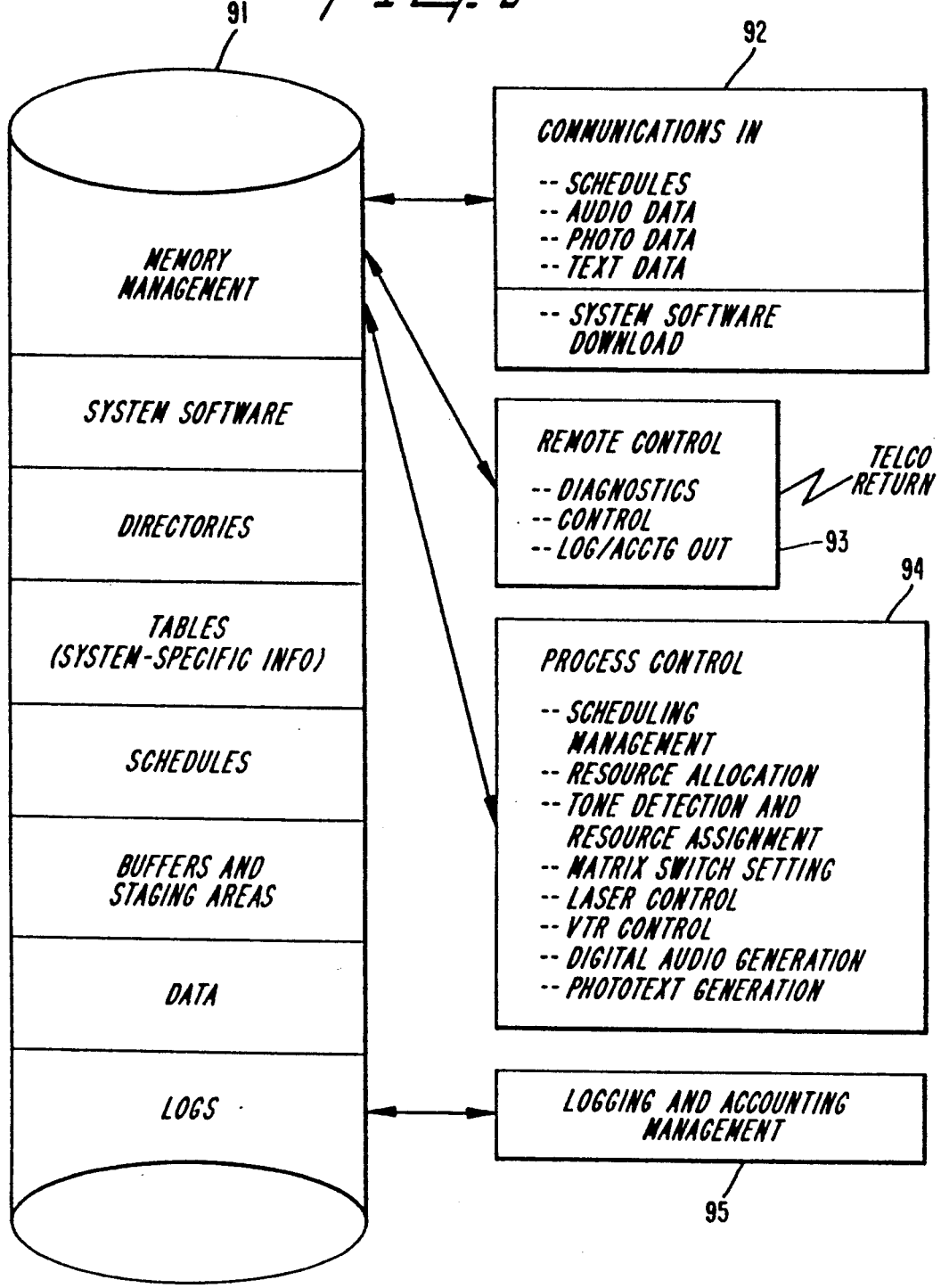

MULTIPLE MEDIA DELIVERY NETWORK METHOD AND APPARATUS

RELATED PATENTS

This patent is a continuation-in-part of patent application entitled, VIDEO INFORMATION DELIVERY NETWORK METHOD AND APPARATUS, having Ser. No. 07/431,359, filing date of Oct. 23, 1989, and now U.S. Pat. No. 5,009,319 issued Mar. 24, 1992.

BACKGROUND OF THE INVENTION

This invention relates to television advertising systems and more particularly to a communications distribution system which allows customizing the video presentation at each ground terminal.

DESCRIPTION OF THE PRIOR ART

The 1980s have seen an equalization among television sectors. Networks, independents, cable, government supported, pay, and direct broadcast satellite are all merging to be simply "television". Viewers support each medium based upon perceived value versus the cost, either direct cash cost or aggravation costs.

An equally important trend is the consumer's demand that television content relate more directly to a viewer Local news has increased in value the importance of content that relates to the consumer's personal interests. These trends are documented as network viewership falls and vertical and local offerings increase.

As more "television" offerings come into play with content that is more "local" and "pertinent", a new opportunity is presented to the television industry:
1. Viewers need to easily know what is on television and what content is pertinent to each group.
2. Viewers want content including consumer, business, entertainment, educational information, and advertising and advertising that is local and pertinent.

OBJECTS AND SUMMARY OF THE INVENTION

An object of the present invention is to provide a communications system that inexpensively and reliably delivers customized consumer, business, entertainment, education and advertising information from a central site to any number of locations in a geographical area.

Another object of the present invention is to uniquely configure the consumer, business, entertainment, educational and advertising communications of each remote site to offer the appropriate services for that particular market.

A further object of the present invention is to control remote sites from the central site by a downlink computer that receives content data signals, which have consumer, business, entertainment, educational and advertising information unique to a particular remote site.

An additional object of the present invention is to customize consumer, business, entertainment, educational and advertising communications at a remote site, using the downlink computer and the content data signals, and as appropriate, combine the customized content data signals with locally originated content data signals.

According to the present invention, as embodied and broadly described herein, a system having a central site with headend equipment and a remote site with downlink equipment for customizing consumer, business, entertainment, educational and advertising information for television or other display medium using a video signal is provided comprising a communications channel, studio-processor means, scheduling-processor means, network-processor means, transmitting means, communications-processor means, first storing means, second storing means, an input source, audio-processor means, video-processor means, a matrix switch, cue-processor and matrix-switch-processor means. The matrix switch and matrix-switch-processor means are optional, and would be used when multiple sources and/or multiple outputs are employed.

At the central site, the studio-processor means generates a plurality of content data signals. The content data signals may include analog or digital text signals, photo-text signals, and/or digital audio signals. The content data signals are stored in a content data base. The scheduling-processor means is located at the central site and is coupled to the studio-processor means. For each of the plurality of content data signals, the scheduling-processor means generates a schedule data signal. The schedule data signal includes a unique identifier, accounting, administrative and scheduling data. The network-processor means is located at the central site and generates a communications signal which includes the plurality of content data signals and the schedule data signals, and which may be formatted with a video signal. The transmitting means is located at the central site and transmits the communications signal over the communications channel.

At the remote site the communications-processor means receives the communications signal and, using the control data signal, selects a first content data signal from the plurality of content data signals, targeted for the remote site. The first storing means is coupled to the communications-processor means. The first storing means stores the video signal. The second storing means is coupled to the communications-processor means. The second storing means stores the first content data signal. The input source, which is optional, is the source for an audio signal. The audio-processor means is coupled to the second storing means and the input source. The audio-processor means mixes the audio signal with the first content data signal to generate an output content signal. The video-processor means is coupled to the first storing means and the audio-processor means. The video-processor means mixes the video signal with keyed graphic or character information. The matrix switch is coupled to the video-processor means, the audio-processor means and a plurality of network communications channels. The cue-processor means is coupled to network food channels through the matrix switch. In response to detecting network-cue signals, the cue-processor means generates insertion-cue signals. The matrix-switch-processor means is coupled to the matrix switch. The matrix-switch-processor means, using the insertion-cue signals, controls the matrix switch and routing of the video and audio signals, the output content signal and a synchronization signal to a network communications channel.

Additional objects and advantages of the invention will be set forth in part in the description that follows, and in part will be obvious from the description, or may be learned by the practice of the invention. The objects and advantages of the invention also maybe realized and attained by means of the instrumentalities and combination particularly pointed out in the appended claims.

BRIEF DESCRIPTION OF THE DRAWINGS

The accompanying drawings, which are incorporated in and constitute a part of this specification, illustrate a preferred embodiment of the invention, and together with the description, serve to explain the principles of the invention.

FIG. 6 is a diagram showing downlink functions.

DETAILED DESCRIPTION OF THE PREFERRED EMBODIMENTS

Figure 1:
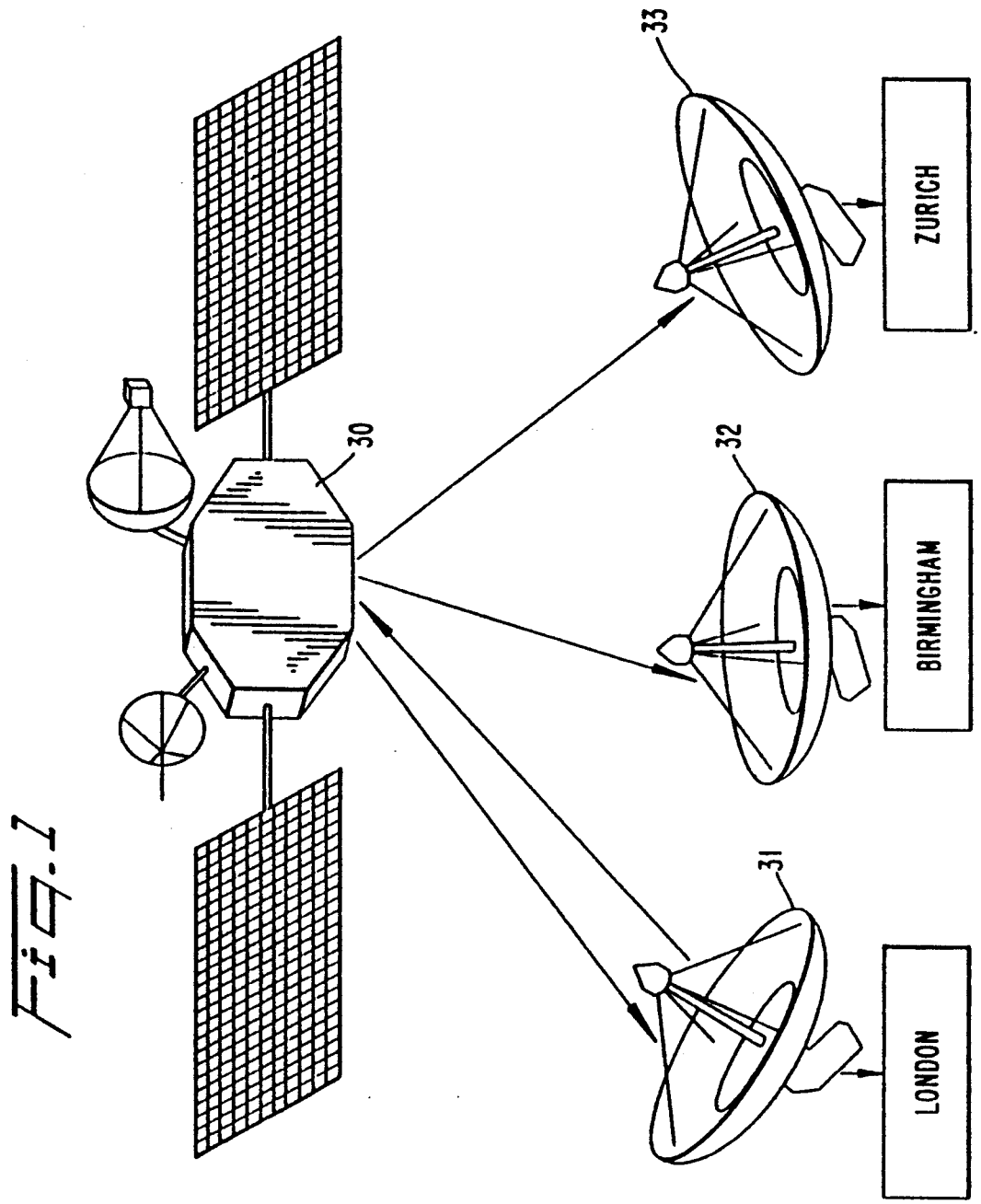
FIG. 1 shows an overview of the multiple media delivery network of the present invention.

Reference will now be made in detail to the present preferred embodiments of the invention, examples of which are illustrated in the accompanying drawings wherein like reference numerals indicate like elements throughout the several views.

The present invention comprises a central site and any number of remote sites. The invention is capable of utilizing broadcast protocols: band-edge, sub-carrier, and vertical blanking intervals. The transmission speeds can be any speed, but in one preferred embodiment, the speed may be varied between 9,600 bits per second and 1,550,000 bits per second. The decision of what protocol, and hence what speed, to use is based on the cost of the communications processor, the transmission reliability required, and the volume of the content data signals.

FIG. 1 illustratively shows an overview of the multiple media delivery network of the present invention. The multiple media delivery network distributes television and customized video and audio presentations from a central site through a satellite network communications channel such as a fiber optics network, radio wave network or any other type communications channel to remote sites. More generally, the multiple media delivery network can distribute consumer, business, entertainment, educational and/or advertisements signals, which may be customized, from a central site to one or more remote sites. A central site London 31, by way of example originates television commercials for transmission through a communications channel shown as a satellite 30 and for delivery to remote sites, which are facilities such as the Birmingham remote site 32, and the Zurich remote site 33, for example. The central site may also serve as a remote site. The remote site may couple into cable systems, VHF or UHF channels, fiber optics networks, hotels, or other rebroadcast systems. The remote site, using content data signals, tags each signal which has been delivered from the central site. Tagging a signal includes taking a primary signal, such as a video signal, and converting or customizing the primary signal into a signal for a particular location by adding a specific content data signal The content data signals may include graphics, text, photographs or audio tracks. The tagged presentations or signal look like local presentation or signals, and are automatically inserted into the communications networks.

Distributed video presentations may be tagged by satellite footprint, such as North American or Pan European. The distributed video presentations may also be tagged: by language, such as all French speaking areas; by country, such as West Germany; by area of dominant influence, such as Washington, D.C.; by cable system, such as Aberdeen; by hotel, such as the Savoy; or by any desirable criteria.

The multiple media delivery network of the present invention allows customized television signals and video content by adding text in any language, adding graphics, replacing the audio track with a different language, or adding full screen tags. The customization, in a general, is accomplished using computers, although specialized processors could be built to accomplish the same means and functions. All tags, i.e., the customizations, may be in digital or analog format. Customization occurs at each remote site when the content data signals are applied to the full motion analog or digital commercial. Video content is defined herein to mean video signals as used for television, computers, and other video interface medium.

The multiple media delivery network of the present invention inserts customized multiple media signal into satellite networks A central scheduling system determines which multiple media signals play on which networks, in what day part or precise time, in which cable system/hotel, etc. The computer at each remote site executes its schedule. Actual insertion of customized content data signals is triggered by data cues initiated, for example, by each satellite network. Affidavits are automatically logged and transmitted back to the central site, which allow for a "ONE BUY, ONE BILL" operation.

Figure 2:
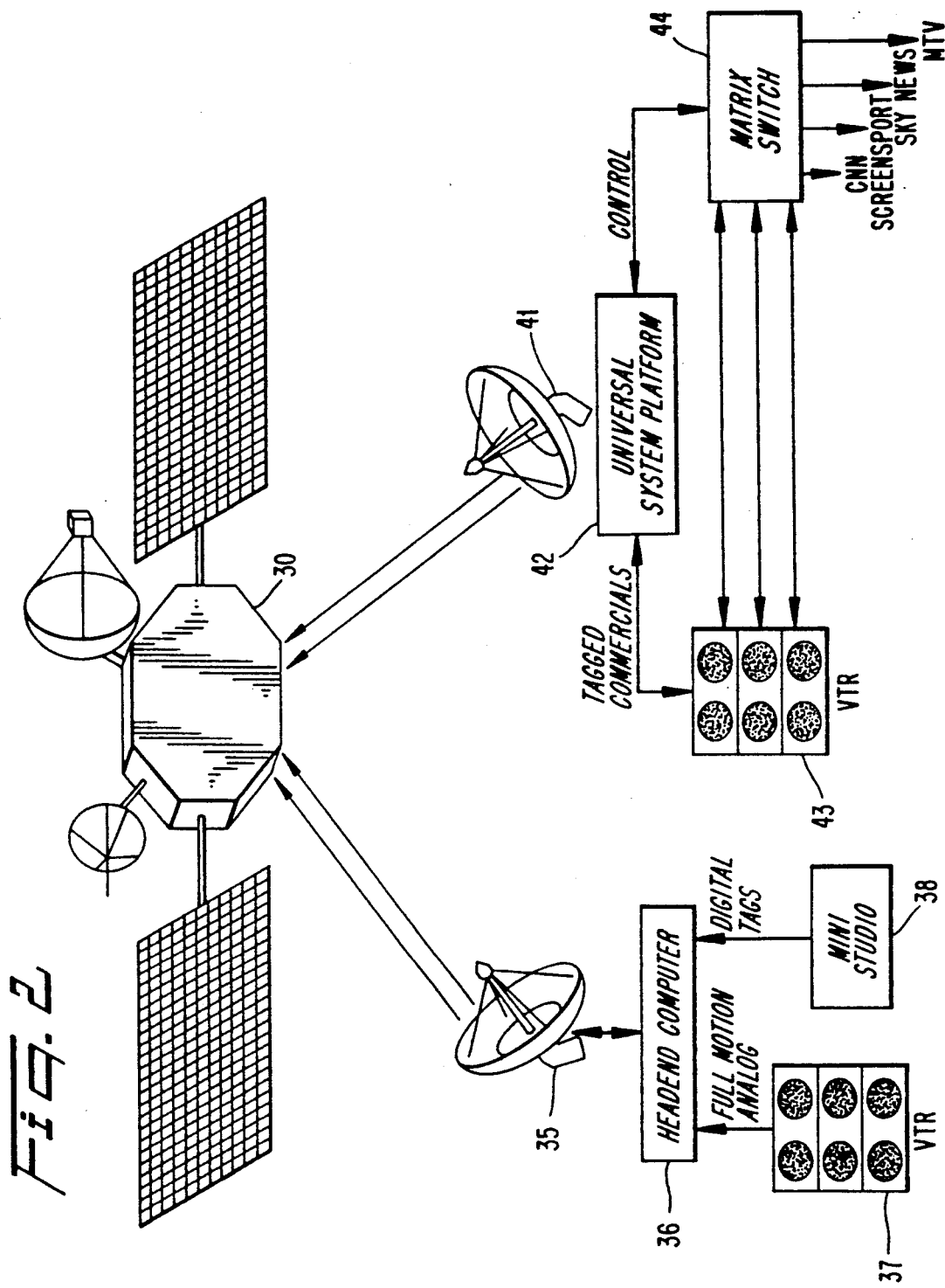
FIG. 2 depicts the multiple media delivery network architecture.

As illustratively shown in FIG. 2, the multiple media delivery network architecture may include a central site coupled through a communication channel shown satellite 30 to a remote site. Broadly, the central site includes a plurality of video storage devices shown as video tape recorders 37, a headend computer 36, a mini studio 38, and a headend antenna 35. The video storage devices maybe analog tape recorder, or digital storage devices such as digital tape, disk, laser disk, etc. The plurality of video tape recorders 37 and the studio 38 are coupled to the headend computer 36. The headend computer 36 is coupled to the headend antenna 35. The video tape recorder 37 provides video content such as a video signal, which may be a full motion analog or digital version a television signal. The video signal may provide consumer business, for entertainment and/or educational information display and listening. Other devices, however, may be used for providing a full motion analog or digital version of a television signal.

The content data signal, which is the customized material for the video content, is generated at the studio 38. The content data signal includes, but is not limited to, adding text in any language, adding graphics, replacing the audio track of the video content with another language, adding or replacing video, and adding full screen tags. The studio adds schedule data signals as digital tags to the content data signal. The headend computer 36, in general, formats the data signal with the video signal for transmission via headend antenna 35 as a communications signal through satellite 30. Alternatively, the content data signal may be generated at a central site remote from the site generating the video signal, and transmitted at a time different from, and over a communications channel separate from, that used for the video signal. Thus, the communications signal may include the content data signal and/or the video content.

In the exemplary arrangement shown, the remote site of FIG. 2 includes one or more video tape recorders 43, matrix switch 44, universal system platform 42 and downlink antenna and receiver 41. The video tape recorder 43 is coupled to the universal system platform 42, and to the matrix switch 44. The universal system platform is coupled to the downlink antenna and receiver 41.

The downlink antenna and receiver 41 receives the communications signal from the satellite 30 The communications signal passes to the universal system platform 42 and is processed by the communications processor. The video signal portion of the communications signal passes through the universal system platform 42 and is recorded onto magnetic tape by the video tape recorder 43. The content data signal and schedule data signal portion of the communications signal is processed by the communications processor of the universal system platform 42. The content data signal is inserted into the proper video content, which is stored on the video storage device shown as the video tape recorder 43.

In operation, the multiple media delivery network of the present invention, at the central site, reviews full-motion analog or digital video content as video signals, designs content data signals for the video signals. The content data signals may be either analog or digital, include text, graphics, full screen tags, and new audio tracks, The content data signals and video signals are sent to each universal system platform of each remote site. The communications processor of the universal system platform receives the content data signals, and the content data signals are stored on a disk. At a prescribed time, the full-motion video signals, which are the analog or digital video content consumer, educational, entertainment, business or other program, are transmitted from the headend computer to each universal system platform. The communications processor in each universal system platform receives and tags uniquely each video signal, thereby generating customized video content. The video content are stored on storage devices such as video tape recorders or digital storage including compact disk read only memory or other devices with digital encoding. In response to receiving a cue signal, the universal system platform inserts the scheduled modified signal into a local network.

HEADEND ARCHITECTURE

Figure 3:
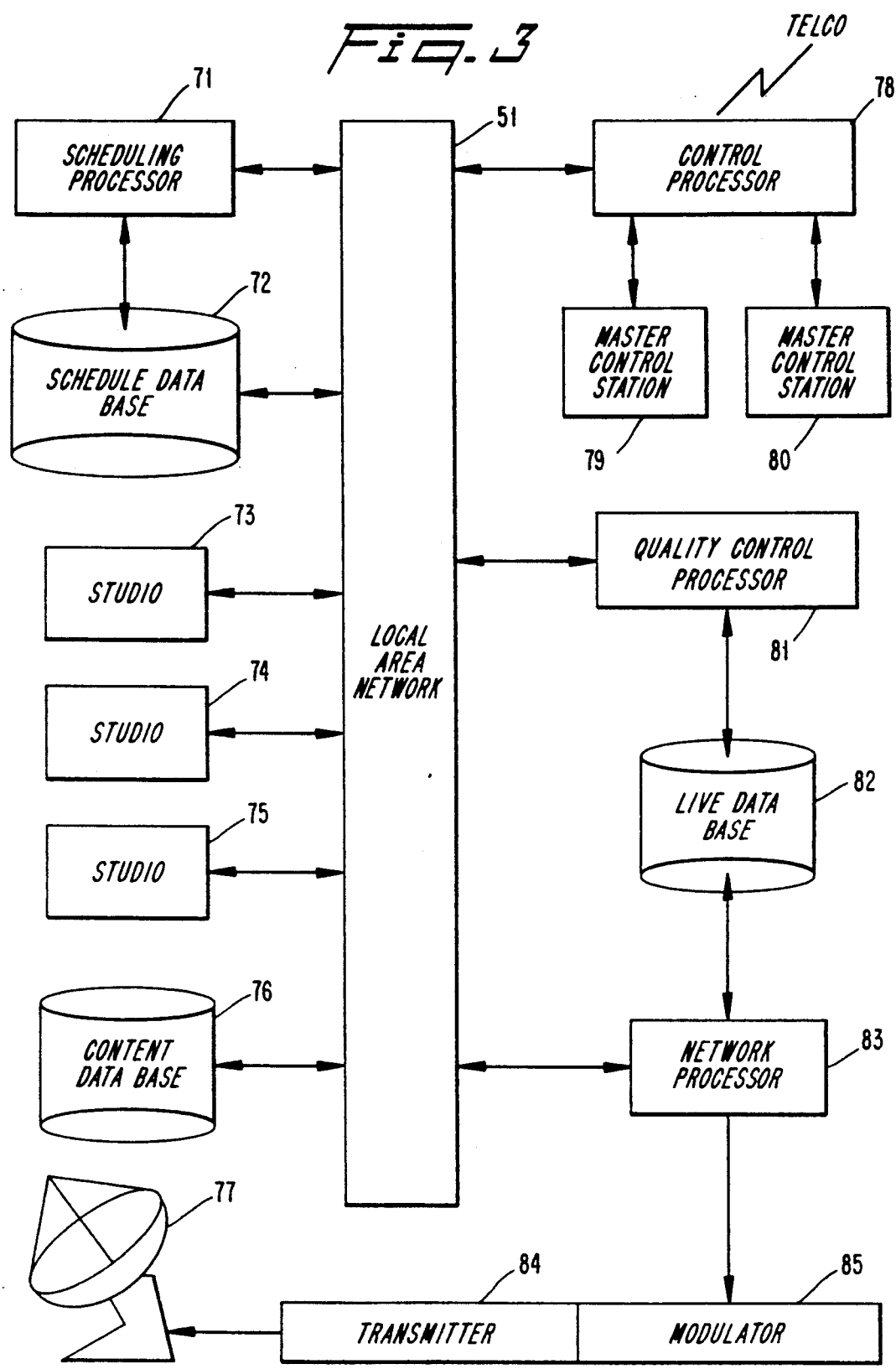
FIG. 3 is a block diagram of the multiple meida delivery network headend architecture.

FIG. 3 provides a graphic representation of the headend equipment. The headend equipment incorporates a series of existing devices that are connected over a local area network 51. The center of the interconnected system is a content data base 76. All content data signals are tracked from the point of receipt to being broadcast on the communications network.

As illustratively shown in FIG. 3, a central site for customizing video content for a video presentation using a video signal is provided comprising studio-processor means, scheduling-processor means, network-processor means, and transmitting means. The studio-processor means, scheduling-processor means, network-processor means, and transmitting means may be embodied as studio processors 73, 74, 75, a scheduling processor 71, a network processor 83, and a transmitter 84, respectively. The studio-processor means, scheduling-processor means, network-processor means and a control processor may all be embodied in a single processor which performs all the functions of the studio-processor means, scheduling-processor means, network-processor means, and the control processor depending on particular system requirements.

The studio processor 73 is located in a studio at the central site and generates a plurality of content data signals. The studio processor 73 digitizes a photograph, provides photographic enhancing, adds test and graphics, and manages the storyboarding of the content. The audio subsystem digitizes audio and allows the creator to integrate the digital audio with the storyboard.

The scheduling processor 71 is located at the central site and is coupled through the local area network 51 to the studio processor 73 and to a schedule data base 72. In response to each of the plurality of content data signals, the scheduling processor 71 generates a schedule data signal, which is stored in schedule data base 72. The schedule data base 72 includes scheduling information for merging content data signals with the video signals. The scheduling processor 71 logs each content data signal received, assigns a unique identifier, records accounting, administrative data, schedules, and, if necessary schedules creation work. The scheduling for the network is accomplished based on network availability.

The quality control processor 81 simulates a downlink system in the field. Each content data signal is assembled, scheduled and then displayed. Rejected video content is returned to the appropriate creation department. Approved video content is double checked for schedule and control accuracy Once each piece of video content is totally approved, the quality control processor 81 places the video content as a content data signal into the live data base 82.

The network processor 83 is located at the central site and generates a communications signal by formatting the plurality of content data signals and the schedule data signals with the video signal. The network processor 83 automatically draws from the live data base 82, formats and packetizes the content data signals and schedule data signals, and transmits the content data signals and schedule data signals as a digital data stream to the modulator 85. The modulator formats the content data signals and schedule data signal as a communications signal. The communications signal may include the video signal, content data signal and/or schedule data signal.

The transmitter 84 is located at the central site, is coupled to the modulator 85, and transmits the communications signal over the communications channel.

The control processor 78 maintains overall control of the system and dispatches tasks to, and coordinates the operation of, the other processors. It runs in a completely unattended mode with no local intervention required. The control processor 78 also drives the master control stations 79, 80 that remotely command each remote site.

HEADEND FUNCTIONS

Figure 4:
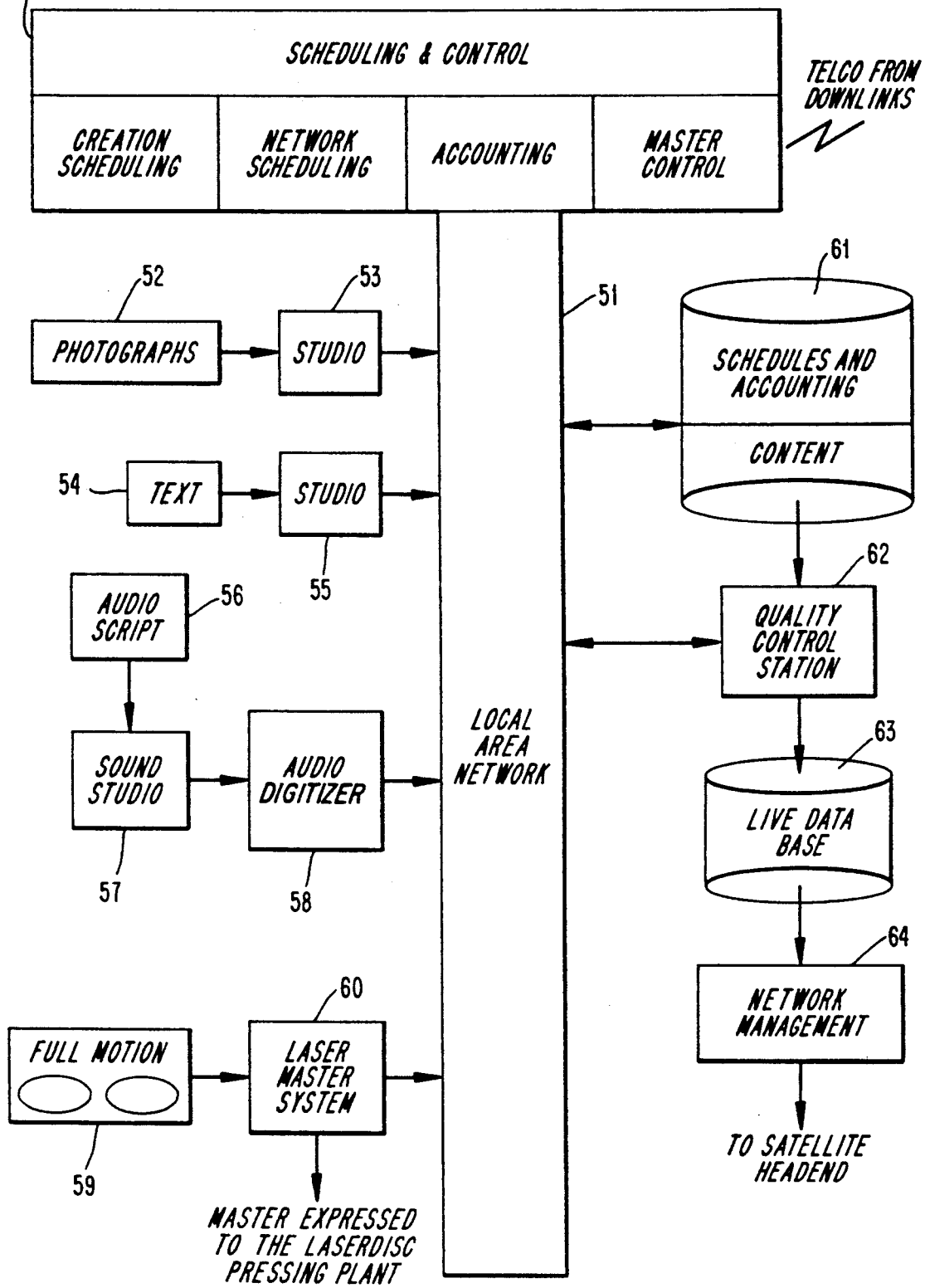
FIG. 4 is a diagram of headend functions.

Scheduling and control functions 50, as illustrated in FIG. 4, include logging each television signal upon receipt, including target audience, display time frames, creation instructions, customizing programs, accounting, and special instructions.

The creation functions include mastering 60 full motion video 59 on to laser disc. Each piece of content data is uniquely identified. The master is expressed to a duplicating facility that in turn expresses the laser discs to each remote site downlink. The label contains explicit instructions as to when the disc is inserted in which machine. A full motion video alternatively be transmitted as a video signal from a central site to a remote site.

A series of studios are connected through the local area network 51. Content data signals having phototext are created using photographs 52 and a studio 53. When each content data signal having phototext is completed it is transmitted to and stored in a content data base 61.

Content data signals having digital audio are developed from audio script 56 in a sound studio 57 using traditional audio equipment. After the audio track has been 'laid down' on tape, the tape is played into the digitizer 58 and then into either a studio to combine with phototext 55, or to the content data base 61.

The quality control functions 62 of the central site include having each content data signal displayed in a quality control station. When requested by a content provider, the content data signal is forwarded for review. The approval process can be accomplished by transmitting the content to a remote site equipped with a preview facility. Quality control, after approval, confirms the final schedule and control data base.

The live data base 63 directly feeds through network management 64 to a modulator which in turn inserts the content into the video signal for transmission to the satellite.

The scheduling and control functions 50 include master control stations at the headend equipment which permit operators to directly dial over standard telephone lines into each remote site downlink equipment. Once connected, the master control station takes control of the downlink equipment at the remote site. A remote diagnostic system checks all functions within the downlink and reports the results to the central site headend equipment. Corrective commands can be issued by the master control stations, including the complete reloading of system software, content, schedules and commands When hardware failures are detected the headend operator telephones the downlink with specific instructions on how to remove the failed hardware. The master control stations are also used to retrieve accounting information from each downlink.

DOWNLINK SYSTEM ARCHITECTURE

Figure 5:
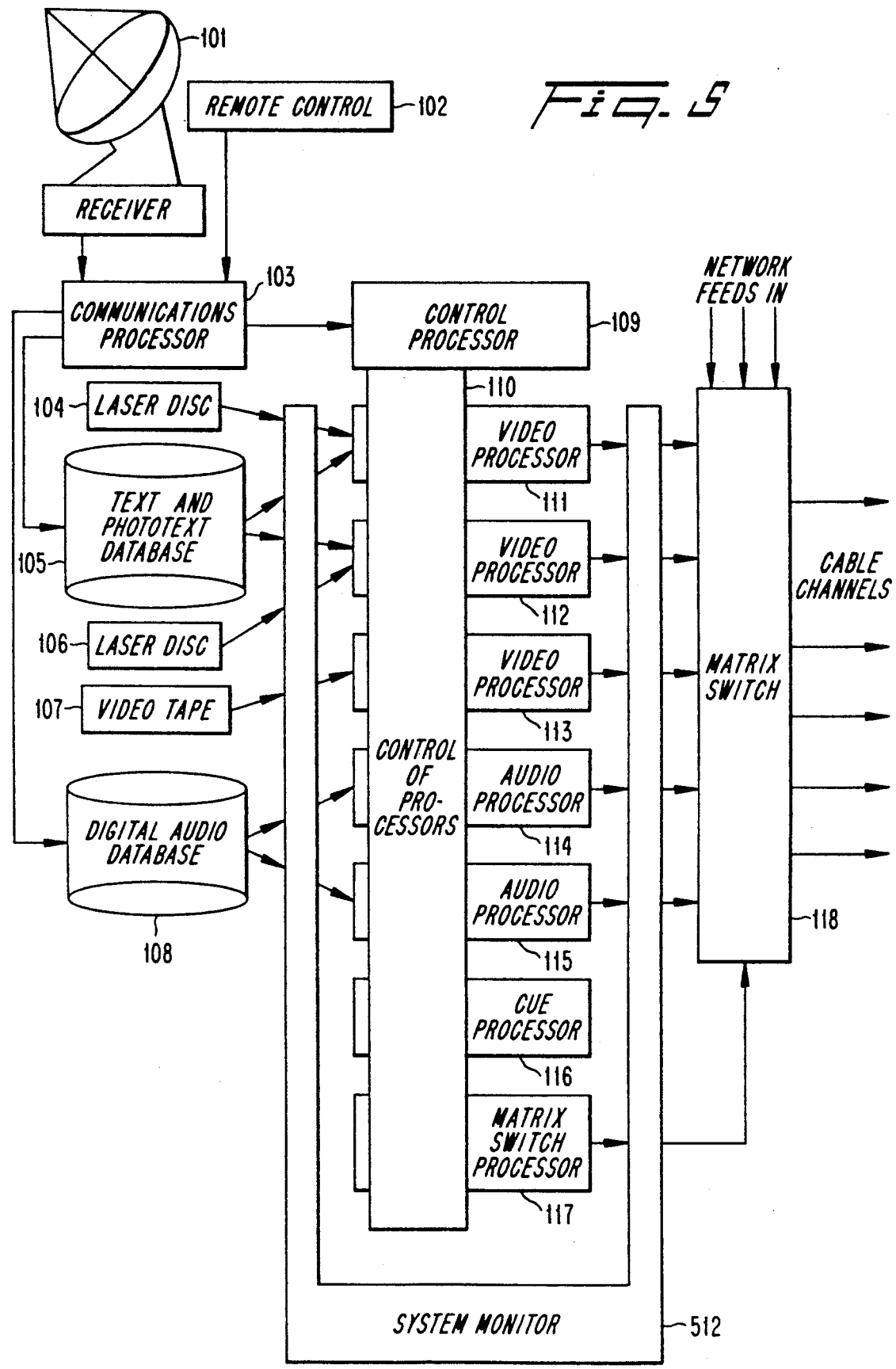
FIG. 5 is a block diagram of the multiple media delivery network downlink architecture.

FIG. 5 is a diagram of the processing subsystems that make up the downlink operating environment. It is a real-time process control computer system having a series of parallel processing elements controlled by a master control program running in the control processor 109. Depending on configuration, in a preferred embodiment, from three to sixteen megabytes of high speed main memory is available to the processors. In addition, the system may be supported by 60 megabytes of disc memory which is expandable. The system architecture allocates the various processors into a single system structure to allow powerful asynchronous processing of independent functions thus ensuring adequate processing power and redundancy through a full range of system loading.

As illustrated in FIG. 5, the remote site downlink equipment of the present invention includes communications-processor means, first storing means, second storing means, audio-processor means, video-processor means, cue-processor means, and matrix-switch-processor means, which may be embodied as a communications processor 103, a first storing device 107, a second storing device 105, 108, audio processors 114, 115, video processors 111, 112, 113, a cue processor 116, and a matrix-switch processor 117, respectively.

At the remote site the communications processor 103 receives the communications signal and, using the control data signal, selects a first content data signal targeted for the remote site apparatus from the plurality of content data signals. The communications processor 103 provides the communications front-end for the system. The communications processor 103 receives all incoming communications from the communications data feed, sorts out the portion required for the specific remote site, and ensures that the data are properly formatted and stored in the downlink system.

All data are error detected and corrected within the communications processor 103 prior to being made available to the rest of the system for use by the other processing applications. In addition, a remote control facility 102 is provided through telephone modem communications allowing total control of the downlink system through the communications processor 103 from the headend equipment or any other remote point. This remote control feature may provide for the following:

1. Remote operation from any location thus allowing the system to be placed in an unattended location.
2. Remote diagnostic analysis directly from the headend equipment in the event of malfunction.
3. Periodic integrity checking of the system from the headend equipment to ensure proper operation.
4. Readout of accounting and logging data on a periodic basis.

The first storing device 107 is located at the remote site and coupled to the communications processor 103. The first storing device 107, which may be embodied as a video tape, stores the video signal which passes through communications processor 103.

The second storing means is lo at the remote site coupled to the video processor 113. The second storing means stores the first content data signal. As illustrated in FIG. 5, if the content data signal is text and phototext, then the second storing means may be embodied as text and phototext data base 105. If the content data signal is digital audio, then the second storing means may be embodied as digital audio database 108.

An input source independently may be located at the remote site and be the source for an audio signal. The audio processors 114, 115 are located at the remote site and are coupled to the second storing means and the input source. The audio processors 114, 115 mix the audio signal with the first content data signal to generate an output content signal. The output content signal typically is an analog signal. The audio processors 114, 115 also provide all the processing required for the generation of digital audio and/or the mixing of a combination of digital audio and a continuous analog audio source. The audio processor 114, 115 can receive input data from the audio data base or input feeds from an analog source. Audio is output to the system through the matrix switch 118.

The video processors 111, 112, 113 are located at the remote site and are coupled to the first storing device 107. The video processors 111, 112, 113 provide all the processing required for mixing live video feeds with keyed graphic or character information as well as the generation of local video in the form of phototext. The video processors 111, 112, 113 also provide for a video in the form of phototext. The video processors 111, 112, 113, in addition, provide for a variety of special effects as well as the generation of local video in the form of phototext. The video processors 111, 112, 113 further provide for a variety of special effects, such as animation, as well as significant memory caching in order to allow multiple video images to be operating at the same time. Each of the video processors 111, 112, 113 can receive input data from the video data base or full motion video from laser disc, video tape or live channel feed. Output of video to the system is effected through the matrix switch 118.

Alternatively, the video processor and audio processor can be used to tag the video signal and content data signal as they are being recorded on video tape. Such signals can be replayed at a later time and are ready for insertion into the network or other channels. The matrix switch 118 and matrix-switch processor 117 are optional, and would be used when multiple sources and/or multiple outputs are employed. Similarly, the cue-decoding processor 116 is required if the matrix switch 118 and matrix-switch processor 117 are used.

The matrix switch 118 is located at the remote site and is coupled to the video processors 111, 112, 113 the audio processors 114, 115 and a plurality of network communications channels.

The cue-decoding processor 116 is located at the remote site and is coupled to network feed channels through the matrix switch 118. In response to detecting network-cue signals, the cue-decoding processor 116 generates insertion-cue signals. The cue-decoding processor 116 provides all the processing required for analysis of all incoming network signals, which may include audio and/or data signals, with detection and discrimination of the coded dual tone multiple frequency (DTMF) or other information. In this manner, valid network cue signals are detected in real-time and directed to the control processor 109 to schedule insertion activities and operate the matrix switch 118.

The matrix-switch processor 117 is located at the remote site and is coupled to the matrix switch 118. In response to the insertion-cue signals, the matrix-switch processor 117 controls the matrix switch and routing of the video signal, the output content data signal and a synchronization signal from a network feed channel to a consumer channel. The matrix switch processor 17 provides for complete status checking and control of the matrix switch 118 used to control the routing of video, audio and synchronization signals, as well as the timing for accurate VBI switching. In addition to switching consumer channels to alternate insertion feeds in various combinations, a variety of options are available for headend monitoring. Through the use of video signal fault detection and power fault detection, the matrix-switch processor 117 ensures that in a "no signal" or power loss situation, the network satellite feeds pass directly through and to, for example, the cable channels, thus protecting the channel from dead air. At a downlink, the present invention may further include system monitor means which may be embodied as a system monitor 512. As illustrated in FIG. 5, the system monitor can be coupled to the output of any of the video processors 111, 112, 113 and/or any of the outputs of the audio processors 114, 115. The system monitor is used for monitoring the output video or audio such that it can also substantially correct and/or report a quality control deficiency at the remote site or to the central site.

DOWNLINK FUNCTION

Content data signals are transmitted on an on-going basis from the central site to remote sites. The communications processor 103 at each remote site monitors the continuous data stream, selects the data addressed to the particular remote site, and stores the data. The content data signal can be inserted in any number of networks. A critically important factor is its ability to provide video synchronization to all networks prior to switching thus providing clean VBI switching even when more than one network is being covered at the same time. Two installed laser disc drives 104, 106, for example, along with discs regularly distributed from the headend, provide full motion video and audio of "national interest". Optionally a video tape recorder 107 is installed and provides for insertion of locally produced content, or store and forward content, as discussed previously. In addition, phototext insertion of content produced on a standard system can be used for local insertions. The principle functions of the downlink include the manner in which the system operates as a store and forward system operating a combination of laser discs, tapes and data store on the system disks.

Primary communications is provided through a communications receiver system and communications processor 103. As shown in FIG. 6, the following communications functions 92 are performed:

1. Receive and store scheduling data.
2. Receive and store digital audio for use in generating local audio.
3. Receive and store video data for use in generating local video and phototext.
4. Receive and store text data for screen tags.
5. Download all system software.

The remote control functions 93 provide for the total control of the downlink system from the headend system. Specifically, the following remote control functions are performed:

1. Remote diagnostics of the local downlink systems from the headend.
2. Operational control of the local system.
3. Readout of all logging and accounting information.

The process control functions 94 are directed by the control processor. The following functions are performed:

1. Management of schedule data providing for the correct scheduling of insertions in local and national avail slots.
2. System resource allocation providing for the matching of insertion resources (laserdisc, VTR, phototext) against needs to fulfill content requirements on channels.
3. Cue recognition and assignment of available resources.
4. Control of the matrix switch to specifically switch content into the covered networks at the appropriate times.
5. Laserdisc control providing for the correct positioning and operation of the available laserdiscs.
6. VTR control providing for the correct positioning of tape and operation of the VTR.
7. Digital audio generation for independent audio or mixing with live network audio.
8. Phototext generation for independent video or keying over live video.

The logging and accounting functions 95 are provided for tracking system activity and recording billable content insertions. The following specific functions are performed:

1. Maintain a log of system activity.
2. Log each individual content insertion successfully supplied for an avail on all covered networks.

All of the above functions interact with memory management 91.

The multiple media delivery network of the present invention is a computer based digital communications system. The primary emphasis is transmitting content data signals and related schedule data signals for command and control data. Sample content data signals include cross channel cable promotions, advertisements, program guides, news, and information programming.

The present invention differs from traditional television networks because the content data preferably are distributed in a digital format versus analog. This permits the content data signals to be transmitted at any time, stored in receiving computers at a remote site, and then displayed on one or more channels. Because each remote site is uniquely identified, the content data signal can be customized to the geographic area in which the content data signal is displayed. For example, a cable promotion can announce a new program and the computer can customize the promotion with the local channel number and time. In the same manner a standard Ford car advertisement can be customized by the computer with a local sound track and a map to the closest Ford dealer. Both the cable promotion and the Ford ad can be inserted through a switch into any number of networks.

The multiple media delivery network of the present invention transmits from the headend equipment frames of video, variable text that can be added to the video, digitized audio, streams of text information, local display schedules, control systems for laser disks and video tape, and the actual software that drives the downlink equipment of each remote site. The transmission schemes vary in speed, but each alternative requires only a small portion of a satellite transponder capacity, reducing space segment cost to under 5% of a traditional video network.

Promotions, advertisements, news and other content is delivered to the headend equipment at a central site either electronically or in hard copy. Full motion video is mastered and laserdiscs are expressed or are transmitted over a communications channel to each remote site. Content data signals having phototext are created using a studio. Each unique content data signal is entered into the scheduling and control system with discrete parameters—when the content can be displayed, to what demographic audience, in combination with what other content, how the content is customized by the downlink computer, and how the displaying of the content is accounted for.

The multiple media delivery network of the present invention is unique in that the system displays full motion video and audio; replaces an existing audio track with analog or digital audio in another language; overlays customized text on full motion video or phototext content; and customizes phototext content automatically at each downlink. The content, whether full motion, phototext, digital audio, or any combination is broadcast quality "clean" switch and the content is automatically synchronized to the video signal. The content provider, be it a cable network, an advertiser, news programmer, or television listing service can precisely customize content, display it to exact demographic audiences, and receive a single accounting of the use of the content.

It will be apparent to those skilled in the art that various modifications can be made to the multiple media delivery network of the present invention without departing from the scope or spirit of the invention, and it is intended that the present invention cover modifications and variations of the multiple media delivery network, provided they come within the scope of the appended claims and their equivalents.

We claim:

1. A system having a central site and a remote site for customizing a video signal comprising:
   a communications channel;
   studio-processor means located at said central site for generating a plurality of content data signals;
   scheduling-processor means located at said central site, coupled to said studio-processor means and responsive to each of the plurality of content data signals for generating a schedule data signal and a control data signal;
   network-processor means located at said central site for generating a communications signal by formatting the plurality of content data signals, a control data signal and the schedule data signal with the video signal;
   means located at said central site for transmitting the communications signal over said communications channel;
   communications-processor means located at said remote site for receiving the communications signal and, using the control data signal, selecting a first content data signal targeted for said remote site from the plurality of content data signals;
   first means located at said remote site coupled to said communications-processor means for storing the video signal;
   second means located at said remote site coupled to said communications-processor means for storing the first content data signal; and
   video-processor means located at said remote site, coupled to said first storing means, and responsive to the schedule data signal for mixing the first content data signal with the video signal.

2. A central site apparatus for customizing a television signal having a video signal comprising:
   studio-processor means for generating at least one content data signal;
   means for storing each content data signal;
   scheduling-processor means coupled to said studio-processor means and responsive to each content data signal for generating a schedule data signal, respectively;
   network-processor means for generating a communications signal from the plurality of content data signals and the schedule data signal;
   a transmitter for transmitting the communications signal; and
   a control processor for coordinating operation of said studio-processor means, said scheduling-processor means and said network-processor means.

3. The central site apparatus as set forth in claim 2 further including a quality control processor for simulating a downlink system by assembling and displaying the content data signal with the video signal.

4. A central site apparatus for customizing advertising for television using a video signal comprising:
   processor means for generating at least one content data signal, responsive to each content data signal for generating a schedule data signal, and for generating a communications data signal by formatting each of the content data signals and the schedule data signals; and a transmitter for transmitting the communications signal.

5. A method using a processor and a transmitter for customizing television signals having at least one video signal, comprising the steps, using said processor and said transmitter, of:

generating a plurality of content data signals;
generating a schedule data signal;
generating a communications signal from the plurality of content data signals and the schedule data signal; and
transmitting the communications signal over a communications channel.

6. A remote site apparatus for customizing televisions signals using at least one content data signal, a schedule data signal and a control data signal, comprising:

communications-processor means responsive to the control data signal for selecting a first content data signal targeted for said remote site apparatus;
second means for storing the first content data signal; and
video-processor means responsive to the schedule data signal for mixing the first content data signal with the video signal.

7. A remote site apparatus for customizing television signals having at least one content data signal, comprising:

communications-processor means for selecting a first content data signal;
second means for storing the first content data signal; and
video-processor means for mixing the first content data signal with a video signal.

8. The remote site apparatus as set forth in claim 7 wherein said second storing means includes a data recording device.

9. The remote site apparatus as set forth in claim 7 further including a control processor for coordinating operation of said communications-processor means, said second storing means and said video-processor means.

10. The remote site apparatus as set forth in claim 9 further including a local area network for connecting said control processor, said communications-processor means, said second storing means and said video-processor means.

11. The remote site apparatus as set forth in claim 7 further including a remote control device for controlling said remote site apparatus from a central site.

12. A remote site apparatus for customizing television signals using a video signal and at least one content data signal, comprising:

communications-processor means for receiving a communications signal and selecting a first content data signal;
second means coupled to said communications-processor means for storing the first content data signal;
video-processor means coupled to said communications-processor means and said second means for mixing the first content data signal with the video signal; and
a control processor for coordinating operation of said communications-processor means, said second storing means and said video-processor means.

13. The remote site apparatus as set forth in claim 12 wherein said second storing means includes a data recording device.

14. The remote site apparatus as set forth in claim 12 further including a local area network for communicating between said control processor, said communications-processor means, said second storing means and said video-processor means.

15. The remote site apparatus as set forth in claim 12 further including a remote control device for controlling said remote site apparatus from a central site.

16. A remote site apparatus for customizing video presentations using a communications signal having a video signal and a content data signal, comprising:

communications-processor means for receiving the communications signal and separating the content data signal from the communications signal;
video-processor means, coupled to said communications-processor means, for mixing the content data signal with the video signal; and
a control processor, coupled to said communications-processor means and said video-processor means, for coordinating operation of said communications-processor means and said video-processor means.

17. The remote site apparatus as set forth in claim 16 further including a local area network for connecting said communications-processor means and said video-processor means.

18. The remote site apparatus as set forth in claim 16 further including a remote control device for controlling said remote said apparatus from a central site.

19. A remote site apparatus for customizing a video presentation having at least content data signal, comprising:

processor means for mixing a first content data signal with a video signal;
a matrix switch coupled to said processor means and a plurality of consumer channels; and
matrix-switch-processor means for controlling said matrix switch and routing the video signal and the content data signal to a particular consumer channel.

20. The remote site apparatus as set forth in claim 19 further including a remote control device for controlling said remote site apparatus from a central site.

21. A remote site apparatus for customizing a video signal using a first content data signal, comprising:

first means for storing the video signal;
second means for storing the first content data signal; and
video-processor means coupled to said first storing means and said second storing means for mixing the first content data signal with the video signal and
a control processor for coordinating operation of said first storing means, said second storing means and said video-processor means.

22. The remote site apparatus as set forth in claim 21 further comprising:

communications-processor means for receiving a communications signal and selecting the first content data signal; and
a local area network for connecting said communications-processor means, said first storing means, said second storing means and said video-processor means.

23. The remote site apparatus as set forth in claim 21 further including a remote control device for controlling said remote site apparatus from a central site.

24. An apparatus having a central site and a remote site for customizing a video signal comprising:
- a communications channel;
- studio-processor means for generating a content data signal;
- scheduling-processor means for generating a schedule data signal;
- network-processor means for generating a communications signal from the video signal, the content data signal and the schedule data signal;
- means for transmitting the communications signal over said communications channel;
- communications-processor means for receiving the communications signal and for selecting the video signal and the content data signal;
- first means for storing the video signal;
- second means for storing the first content data signal; and
- video-processor means for mixing the first content data signal with the video signal.

25. An apparatus having a central site and a remote site for customizing a video signal comprising:
- a communications channel;
- studio-processor means located at said central site for generating a content data signal;
- network-processor means located at said central site for generating a communications signal having the video signal and the content data signal;
- means located at said central site for transmitting the communications signal over said communications channel;
- communications-processor means located at said remote site for receiving the communications signal and selecting the content data signal; and
- video-processor means located at said remote site for mixing the content data signal with the video signal.

26. The apparatus as set forth in claim 25, further including:
- cue-processor means for generating insertion-cue signals;
- a matrix switch coupled to said video-processor means and operatively coupled to a plurality of consumer channels; and
- matrix-switch-processor means responsive to the insertion-cue signals for controlling said matrix switch and for routing the video signal with the content data signal to a particular consumer channel.

27. A method using a processor for customizing at least one content data signal and a video signal, comprising the steps, using said processor, of:
- receiving a communications signal and selecting a first content data signal from the at least one content data signal;
- storing the first content data signal;
- mixing the first content data signal with a video signal to generate a multiple media signal; and
- routing the multiple media signal to a particular consumer channel.

28. A method using a processor for customizing a content data signal and a video signal, comprising the steps, using said processor, of:
- mixing the content data signal with the video signal, and
- routing the video signal mixed with the content data signal to a particular consumer channel.

29. A system having a central site and a remote site for customizing a video signal comprising:
- a communications channel;
- a studio processor located at said central site for generating a plurality of content data signals;
- a scheduling processor located at said central site, coupled to said studio processor and responsive to each of the plurality of content data signals for generating a schedule data signal and a control data signal;
- a network processor located at said central site for generating a communications signal by formatting the plurality of content data signals, a control data signal and the schedule data signal with the video signal;
- a transmitter located at said central site for transmitting the communications signal over said communications channel;
- a communications processor located at said remote site for receiving the communications signal and, using the control data signal, selecting a first content data signal targeted for said remote site from the plurality of content data signals;
- a first storing device located at said remote site coupled to said communications processor for storing the video signal;
- a second storing device located at said remote site coupled to said communications processor for storing the first content data signal; and
- a video processor located at said remote site, coupled to said first storing device, and responsive to the schedule data signal for mixing the first content data signal with the video signal.

30. A central site apparatus for customizing a television signal having a video signal comprising:
- a studio processor for generating at least one content data signal;
- a content data base for storing each content data signal;
- a scheduling processor coupled to said studio processor and responsive to each content data signal for generating a schedule data signal, respectively;
- a network processor for generating a communications signal from the plurality of content data signals and the schedule data signal;
- a transmitter for transmitting the communications signal; and
- a control processor for coordinating operation of said studio processor, said scheduling processor and said network processor.

31. The central site apparatus as set forth in claim 30, further including a quality control processor for simulating a downlink system by assembling and displaying the content data signal with the video signal.

32. The central site apparatus as set forth in claim 30 further including a local area network for connecting said control processor, said studio processor, said scheduling processor and said network processor.

33. A central site apparatus for customizing advertising for television using a video signal comprising:
- a plurality of processors for generating at least one content data signal, responsive to each content data signal for generating a schedule data signal, and for generating a communications data signal by formatting each of the content data signals and the schedule data signals; and
- a transmitter for transmitting the communications signal.

34. The central site apparatus as set forth in claim 33 wherein said plurality of processors format the plurality of content data signals and the schedule data signals with the video signal.

35. A method for customizing television signals having at least one video signal, comprising the steps of:
generating a plurality of content data signals;
generating a schedule data signal;
generating a communications signal from the plurality of content data signals and the schedule data signal; and
transmitting the communications signal.

36. A remote site apparatus for customizing televisions signals using at least one content data signal, a schedule data signal and a control data signal, comprising:
a communications processor responsive to the control data signal for selecting a first content data signal targeted for said remote site apparatus;
a second storing device for storing the first content data signal; and
a video processor responsive to the schedule data signal for mixing the first content data signal with the video signal.

37. A remote site apparatus for customizing television signals having at least one content data signal, comprising:
a communications processor for selecting a first content data signals;
a second storing device for storing the first content data signal; and
a video processor for mixing the first content data signal with a video signal.

38. The remote site apparatus as set forth in claim 37 wherein said second storing device includes a data recording device.

39. The remote site apparatus as set forth in claim 37 further including a control processor for coordinating operation of said communications processor, said second storing device and said video processor.

40. The remote site apparatus as set forth in claim 39 further including a local area network for connecting said control processor, said communications processor, said second storing device and said video processor.

41. The remote site apparatus as set forth in claim 37 further including a remote control device for controlling said remote site apparatus from a central site.

42. A remote site apparatus for customizing television signals using a video signal and at least one content data signal, comprising:
a communications processor for receiving a communications signal and selecting a first content data signal;
a second storing device coupled to said communications processor for storing the first content data signal;
a video processor coupled to said communications processor and said second storing device for mixing the first content data signal with the video signal; and
a control processor for coordinating operation of said communications processor, said second storing device and said video processor.

43. The remote site apparatus as set forth in claim 42 wherein said second storing device includes a data recording device.

44. The remote site apparatus as set forth in claim 42 further including a local area network for communicating between said control processor, said communications processor, said second storing device and said video processor.

45. The remote site apparatus as set forth in claim 42 further including a remote control device for controlling said remote site apparatus from a central site.

46. A remote site apparatus for customizing video presentations using a communications signal having a video signal and a content data signal, comprising:
a communications processor for receiving the communications signal and separating the content data signal from the communications signal;
a video processor, coupled to said communications processor, for mixing the content data signal with the video signal; and
a control processor, coupled to said communications processor and said video processor, for coordinating operation of said communications processor and said video processor.

47. The remote site apparatus as set forth in claim 46 further including a local area network for connecting said communications processor and said video processor.

48. The remote site apparatus as set forth in claim 46 further including a remote control device for controlling said remote site apparatus from a central site.

49. A remote site apparatus for customizing a video presentation having at least one content data signal, comprising:
a video processor for mixing a first content data signal with a video signal;
a matrix switch coupled to said video processor and a plurality of consumer channels; and
a matrix-switch processor for controlling said matrix switch and routing the video signal and the content data signal to a particular consumer channel.

50. The remote site apparatus as set forth in claim 49 further including a remote control device for controlling said remote site apparatus from a central site.

51. A remote site apparatus for customizing a video signal using a first content data signal, comprising:
a first storing device for storing the video signal;
a second storing device for storing the first content data signal; and
a video processor coupled to said first storing device and said second storing device for mixing the first content data signal with the video signal; and
a control processor for coordinating operation of said first storing device, said second storing device and said video processor.

52. The remote site apparatus as set froth in claim 51 further comprising:
a communications processor for receiving a communications signal and selecting the first content data signal; and
a local area network for connecting said communications processor, said first storing device, said second storing device and said video processor.

53. The remote site apparatus as set forth in claim 51 further including a control processor for coordinating operation of said communications processor, said first storing device, said second storing device and said video processor.

54. The remote site apparatus as set forth in claim 53 further including a local area network for connecting said control processor, said communications processor, said first storing device, said second storing device and said video processor.

55. The remote site apparatus as set forth in claim 51 further including a remote control device for controlling said remote site apparatus from a central site.

56. An apparatus having a central site and a remote site for customizing a video signal comprising:
- a communications channel;
- a studio processor for generating a content data signal;
- a scheduling processor for generating a schedule data signal;
- a network processor for generating a communications signal from the video signal, the content data signal and the schedule data signal;
- a transmitter for transmitting the communications signal over said communications channel;
- a communications processor for receiving the communications signal and for selecting the video signal and the content data signal;
- a first storing device for storing the video signal;
- a second storing device for storing the first content data signal; and
- a video processor for mixing the first content data signal with the video signal.

57. An apparatus having a central site and a remote site for customizing a video signal comprising:
- a communications channel;
- a studio processor located at said central site for generating a content data signal;
- a network processor located at said central site for generating a communications signal having the video signal and the content data signal;
- a transmitter located at said central site for transmitting the communications signal over said communications channel;
- a communications processor located at said remote site for receiving the communications signal and selecting the content data signal; and
- a video processor located at said remote site for mixing the content data signal with the video signal.

58. The apparatus as set forth in claim 57 further including:
- a cue processor for generating insertion-cue signals;
- a matrix switch coupled to said video processor and operatively coupled to a plurality of consumer channels; and
- a matrix-switch processor responsive to the insertion-cue signals for controlling said matrix switch and for routing the video signal with the content data signal to a particular consumer channel.

59. A method for customizing at least one content data signal and a video signal, comprising the steps of:
- receiving and selecting a first content data signal from the at least one content data signal;
- mixing the first content data signal with a video signal to generate a multiple media signal; and
- routing the multiple media signal to a particular consumer channel.

60. A method for customizing a content data signal and a video signal comprising the steps of:
- mixing the content data signal with the video signal; and
- routing the video signal mixed with the content data signal to a particular consumer channel.

* * * * *

UNITED STATES PATENT AND TRADEMARK OFFICE
CERTIFICATE OF CORRECTION

PATENT NO. : 5,283,639

DATED : February 1, 1994

INVENTOR(S) : Arthur G. Esch, et al

It is certified that error appears in the above-identified patent and that said Letters Patent is hereby corrected as shown below:

Column 13, line 34, delete "and"; at line 36, delete "." and insert --;--, and beginning after line 36 insert the following:

--a control processor for coordinating operation of said communications-process means, said second storing means and said video-processor; a local area network for connecting said control processor, said communications-processor means, said second storing means and said video-processor means- Column 13, line 65, delete "and"; at line 68, delete "." and insert --; and--, and beginning after line 68 insert the following:

--a local area network for communicating between said control processor, said communications-processor means, said second storing means and said video-processor means.--

Column 14, line 20, delete "and"; at line 24, delete "." and insert --; and -- and beginning after line 24, insert the following:

--a local area network for connecting said communications-processor means and said video-processor means.--

UNITED STATES PATENT AND TRADEMARK OFFICE
CERTIFICATE OF CORRECTION

PATENT NO. : 5,283,639

Page 2 of 3

DATED : February 1, 1994

INVENTOR(S) : Arthur G. Esch, et al

It is certified that error appears in the above-identified patent and that said Letters Patent is hereby corrected as shown below:

Column 17, line 31, delete "and"; at line 33, delete "." and insert --;--, and beginning after line 33, insert the following:

--a local control processor for coordinating operation of said communications processor, said second storing device and said video processor; and a local area network for connecting said control processor, said communications processor, said second storing device and said video processor- Column 17, line 60, delete "and"; at line 63, delete "." and insert --; and--, and beginning after line 63 insert the following:

--a local area network for connecting said communications processor and said video processor.--

Column 18, line 15, delete "and", at line 19, insert --; and ¶ a local area network for connecting said communications processor and said video processor--

UNITED STATES PATENT AND TRADEMARK OFFICE
CERTIFICATE OF CORRECTION

PATENT NO. : 5,283,639

DATED : February 1, 1994

INVENTOR(S) : Arthur G. Esch, et al

It is certified that error appears in the above-identified patent and that said Letters Patent is hereby corrected as shown below:

Columns 13-20, claims "9,10,14,17,27,28,39,40,44,47,59, and 60" should be canceled. The remaining claims should be renumbered as 1-48 respectively.

Signed and Sealed this

Second Day of May, 1995

*Attest:*

BRUCE LEHMAN

*Attesting Officer*  *Commissioner of Patents and Trademarks*